United States Patent
Eom et al.

(10) Patent No.: US 8,643,737 B2
(45) Date of Patent: Feb. 4, 2014

(54) MOBILE TERMINAL AND METHOD FOR CORRECTING A CAPTURED IMAGE

(75) Inventors: Min Young Eom, Seoul (KR); Jeong Han Kim, Seoul (KR); Nam Su Lee, Seoul (KR); Yeong Kyu Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 493 days.

(21) Appl. No.: 12/406,913

(22) Filed: Mar. 18, 2009

(65) Prior Publication Data

US 2009/0244311 A1 Oct. 1, 2009

(30) Foreign Application Priority Data

Mar. 25, 2008 (KR) .................. 10-2008-0027463

(51) Int. Cl.
*H04N 5/228* (2006.01)
*H04N 5/222* (2006.01)

(52) U.S. Cl.
USPC .................. 348/222.1; 348/333.02

(58) Field of Classification Search
None
See application file for complete search history.

(56) References Cited

U.S. PATENT DOCUMENTS

| | | | |
|---|---|---|---|
| 7,315,631 B1 | 1/2008 | Corcoran et al. | |
| 2004/0228528 A1* | 11/2004 | Lao | 382/167 |
| 2006/0152578 A1* | 7/2006 | Kim | 348/14.01 |
| 2006/0204054 A1 | 9/2006 | Steinberg et al. | |
| 2007/0147820 A1 | 6/2007 | Steinberg et al. | |
| 2007/0195174 A1* | 8/2007 | Oren | 348/222.1 |
| 2007/0274573 A1* | 11/2007 | Hori | 382/118 |
| 2007/0291334 A1* | 12/2007 | Nakanishi | 358/509 |
| 2008/0036882 A1 | 2/2008 | Uemura et al. | |
| 2008/0130992 A1* | 6/2008 | Fujii | 382/167 |
| 2008/0231726 A1* | 9/2008 | John | 348/223.1 |
| 2008/0316327 A1* | 12/2008 | Steinberg et al. | 348/222.1 |

FOREIGN PATENT DOCUMENTS

| | | |
|---|---|---|
| EP | 1688883 | 8/2006 |
| EP | 1855460 | 11/2007 |

OTHER PUBLICATIONS

European Patent Office Application Serial No. 09155283.6, Search Report dated Jan. 2, 2013, 7 pages.

* cited by examiner

*Primary Examiner* — Justin P Misleh
(74) *Attorney, Agent, or Firm* — Lee, Hong, Degerman, Kang & Waimey

(57) ABSTRACT

A mobile terminal and a method of controlling a mobile terminal are provided. The method includes displaying a camera preview image; detecting a face area from the camera preview image; if a button for capturing an image is manipulated, correcting an image captured by a camera using the detected face area and displaying the corrected captured image; and storing the corrected captured image.

13 Claims, 13 Drawing Sheets

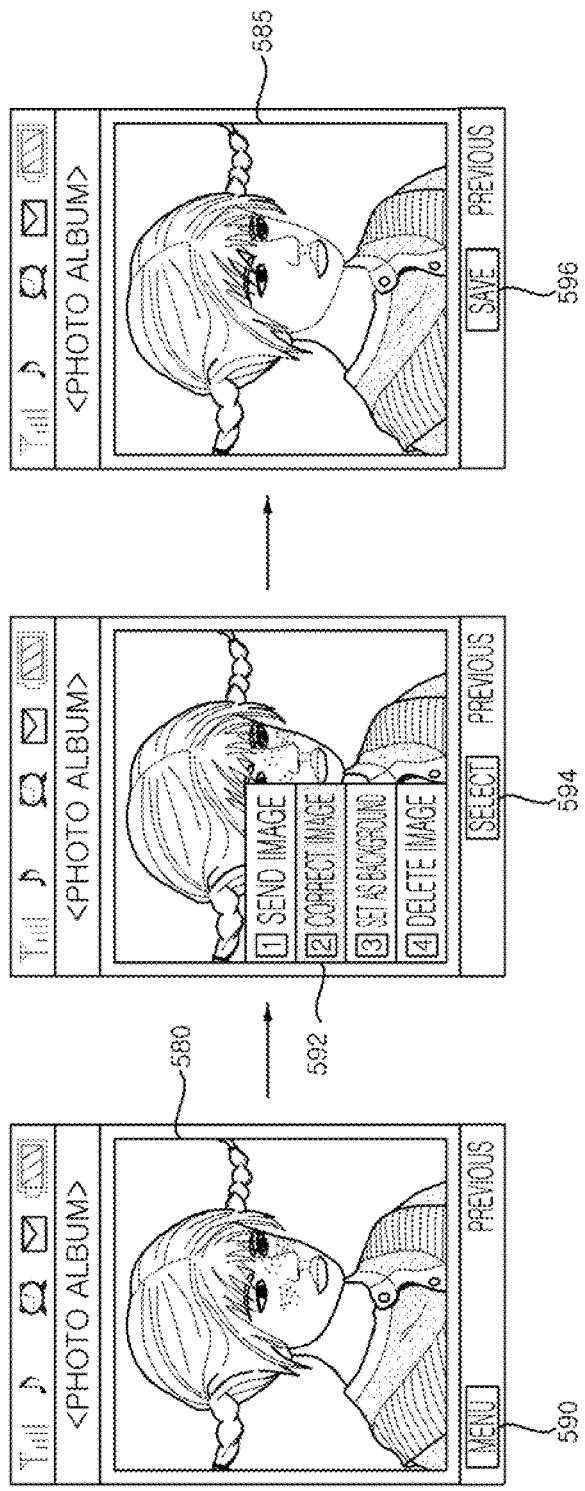

MOBILE TERMINAL AND METHOD FOR CORRECTING A CAPTURED IMAGE

CROSS-REFERENCE TO RELATED APPLICATION

Pursuant to 35 U.S.C. 119(a), this application claims the priority benefit of earlier filing date and right of priority to Korean Patent Application No. 10-2008-0027463, filed on Mar. 25, 2008, the contents of which is all hereby incorporated by reference herein in its entirety.

BACKGROUND OF THE INVENTION

1. Field of the Invention

The present invention relates to a mobile terminal and a method of controlling the mobile terminal, in which an image captured by a camera can be automatically corrected.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals has steadily grown due to a growing tendency of considering mobile terminals as personal items that can represent personal individuality.

In the meantime, an increasing number of mobile terminals are being equipped with high-resolution cameras and are thus capable of capturing vivid images. In order to keep up with this trend, various techniques for correcting images captured by the cameras of mobile terminals have been developed. These techniques, however, can only be applied to images previously stored in mobile terminals. In addition, these techniques are generally characterized by correcting a whole image, and may thus result in huge discrepancies between a corrected image and its original image.

SUMMARY OF THE INVENTION

The present invention provides a mobile terminal and a method of controlling the mobile terminal, in which a certain part of an image captured by a camera can be automatically corrected and the automatically-corrected image can be displayed on a screen.

According to an aspect of the present invention, there is a method of controlling a mobile terminal, the method including displaying a camera preview image; detecting a face area from the camera preview image; if a button for capturing an image is manipulated, correcting an image captured by a camera using the detected face area and displaying the corrected captured image; and storing the corrected captured image.

According to another aspect of the present invention, there is a mobile terminal including a camera; a display module configured to display a camera preview image provided by the camera; and a controller configured to detect a face area from the camera preview image, correct an image captured by the camera using the detected face area and display the corrected captured image on the display module.

According to another aspect of the present invention, there is a computer-readable recording medium having recorded thereon a computer program for executing a method of controlling a mobile terminal, the method including displaying a camera preview image; detecting a face area from the camera preview image; if a button for capturing an image is manipulated, correcting an image captured by a camera using the detected face area and displaying the corrected captured image; and storing the corrected captured image.

BRIEF DESCRIPTION OF THE DRAWINGS

The above and other features and advantages of the present invention will become more apparent by describing in detail preferred embodiments thereof with reference to the attached drawings in which:

FIGS. 7 through 14 illustrate diagrams for explaining the methods shown in FIGS. 4 through 6.

DETAILED DESCRIPTION OF THE INVENTION

The present invention will hereinafter be described in detail with reference to the accompanying drawings in which exemplary embodiments of the invention are shown. The term 'mobile terminal', as used herein, may indicate a mobile phone, a smart phone, a laptop book computer, a digital broadcast receiver, a personal digital assistant (PDA), a portable multimedia player (PMP), or a navigation device. The terms 'module' and 'unit', as used herein, may be used interchangeably.

Figure 1:
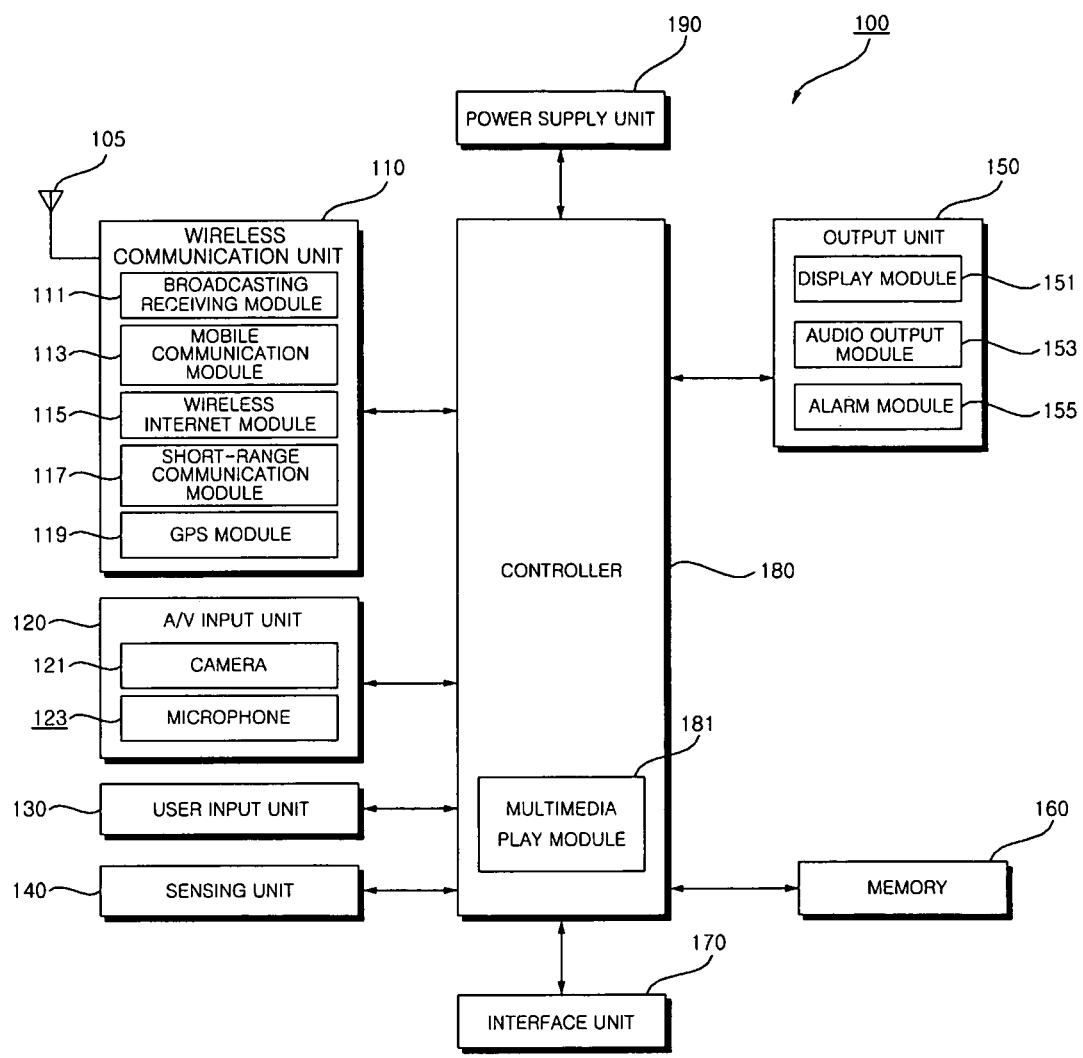
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 110 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee. The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The output unit 150 may output audio signals, video signals and alarm signals. The output unit 150 may include the display module 151, an audio output module 153 and an alarm module 155.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by a user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output, for example, a vibration signal, upon receiving a call signal or a message. In addition, the alarm module 155 may receive a key signal and may output, for example, a vibration signal, as feedback to the key signal. Therefore, the user may be able to determine whether an event has occurred based on a vibration signal output by the alarm module 155. An alarm signal for notifying the user of the occurrence of an event may be output not only by the alarm module 155 but also by the display module 151 or the audio output module 153.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

If the mobile terminal 100 is connected to an external cradle, the interface unit 170 may be used as a path for supplying power from the external cradle to the mobile terminal 100 or may be used as a path for transmitting various command signals from the external cradle to the mobile terminal 100. The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system and a satellite-based communication system. The mobile terminal 100 may be configured to be able to operate in a communication system transmitting data as frames or packets.

The exterior of the mobile terminal 100 will hereinafter be described in detail with reference to FIGS. 2 and 3. For convenience, assume that the mobile terminal 100 is a slider-type mobile phone equipped with a full touch screen and a slider-type keypad. However, the present invention is not restricted to a slider-type mobile phone. Rather, the present invention can be applied to various mobile phones, other than a slider-type mobile phone, for example, a folder-type mobile phone, a swing-type mobile phone and a slider-type mobile phone.

Figure 2:
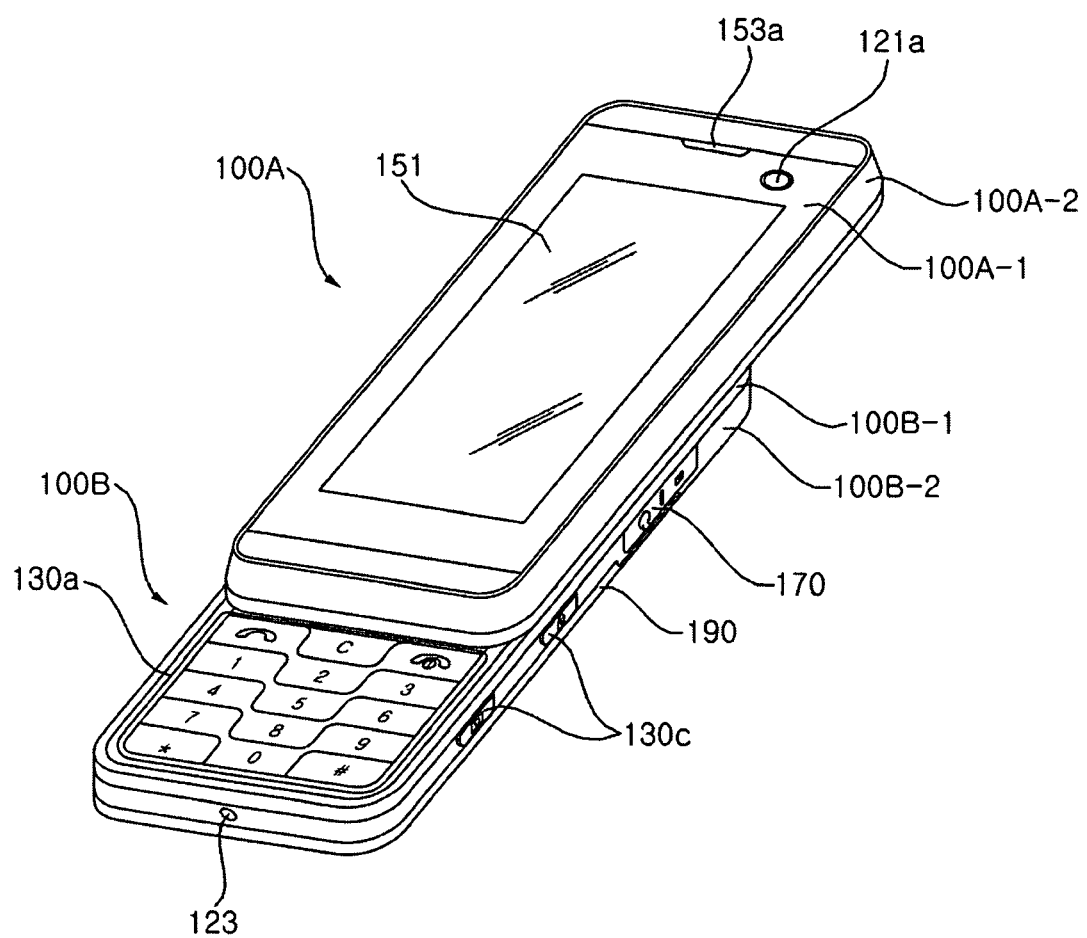
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100a and a second body 100b configured to be able to slide in at least one direction on the first body 100A.

When the first body 100A overlaps the second body 100B, the mobile terminal 100 may be determined to be closed. When the first body 100A exposes at least part of the second body 100B, the mobile terminal 100 may be determined to be opened up.

When the mobile terminal 100 is closed, the mobile terminal 100 may generally operate in an idle mode, and may be manually released from the idle mode by a user. When the mobile terminal 100 is opened up, the mobile terminal 100 may generally operate in a call mode, and may be placed in the idle mode either manually by a user or automatically after the lapse of a predetermined amount of time.

The first body 100A may include a first front case 100A-1 and a first rear case 100A-2, which form the exterior of the first body 100A. Various electronic products may be installed in the empty space between the first front case 100A-1 and the first rear case 100A-2. At least one intermediate case may be additionally disposed between the first front case 100A-1 and the first rear case 100A-2.

The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first sound output module 153a, and a first camera 121a may be disposed on the first body 100A, and particularly, on the first front case 100A-1.

The display module 151 may include an LCD or an OLED, which visually represents information. Since a touch pad is configured to overlap the display module 151 and thus to realize a layer structure, the display module 151 may serve as a touch screen. Thus, it is possible for a user to input information to the display module 151 simply by touching the display module 151.

The first sound output module 153a may be implemented as a receiver or a speaker. The first camera 121a may be configured to capture a still image or a moving image of a user.

The second body 100B may include a second front case 100B-1 and a second rear case 100B-2, which form the exterior of the second body 100B.

A first user input module 130a may be disposed at the front of the second body 100B, and particularly, at the front of the second front case 100B-1. A second user input module 130c, the microphone 123 and the interface unit 170 may be disposed on the second front case 100B-1 or the second rear case 100B-2.

The first user input module 130a may receive various commands for controlling the operation of the mobile terminal 100. The first user input module 130a may be equipped with a number of input keys such as a joystick key, a touch pad, a trackball, a pointing stick or a finger mouse performing the functions of a mouse The first and second user input modules 130a and 130c may be collectively referred to as the user input unit 130. The user input unit 130 may adopt various manipulation methods as long as it can offer tactile feedback to a user.

For example, the user input unit 130 may be implemented as a dome switch or a touch pad which receives a command or information upon being pushed or touched by a user. Alternatively, the user input unit 130 may be implemented as a wheel, a jog dial, or a joystick.

The first user input module 130a may allow a user to input various commands such as 'start', 'end', and 'scroll' and various numbers, characters or symbols. The second user input module 130c may serve as a hot key for activating certain functions of the mobile terminal 100. The microphone 123 may be configured to be able to receive the voice of a user or other sounds.

The power supply unit 190 may be disposed on the second rear case 100B-2. The power supply unit 190 may be a rechargeable battery and may be coupled to the second body 100B so as to be attachable to or detachable from the second body 100B.

Figure 3:
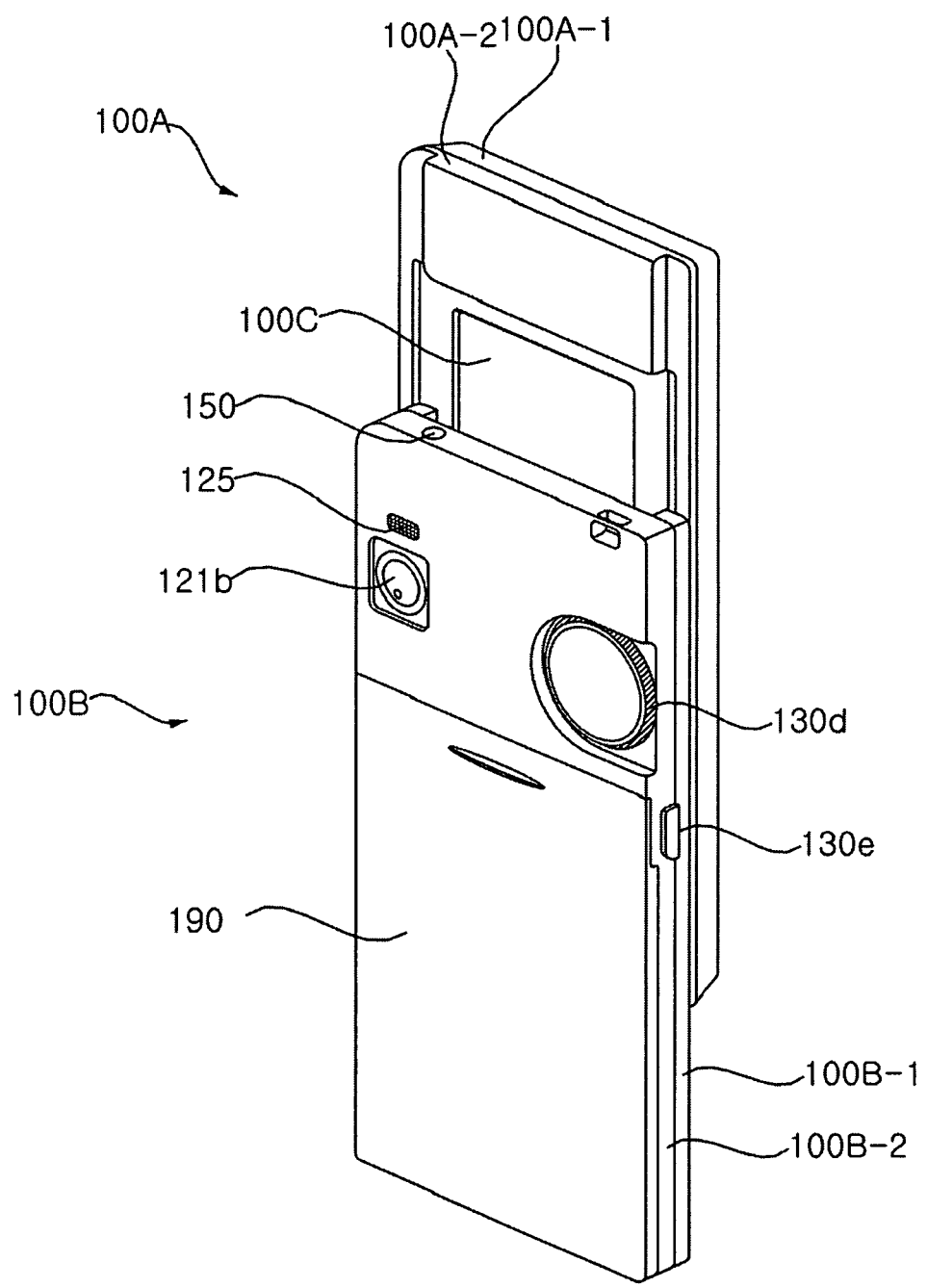
FIG. 3 illustrates a rear perspective view of the mobile terminal shown in FIG. 1.

FIG. 3 illustrates a rear perspective view of the mobile terminal 100 shown in FIG. 2. Referring to FIG. 3, a second camera 121b may be disposed at the rear of the second rear case 100B-2 of the second body 100B.

The second camera 121b may have a different photographing direction from that of the first camera 121a shown in FIG. 2. In addition, the second camera 121b may have a different resolution from that of the first camera 121a. For example, the first camera 121a may be used to capture an image of the face of a user and then readily transmit the captured image during a video call. Thus, a low-resolution camera may be used as the first camera 121a. The second camera 121b may be used to capture an image of an ordinary subject. Given that images captured by the second camera 121b generally do not need to be transmitted, a high-resolution camera may be used as the second camera 121b.

In addition, a third user input module 130d may be disposed at the rear of the second rear case 100B-2 of the second body 100B. The third user input module 130d may be implemented as a wheel and may serve as a special function key such as a scroll key.

A camera flash 125 may be disposed near the second camera 121b. The camera flash 125 illuminates a subject when the second camera 121b captures an image of the subject.

An antenna 105 for receiving a broadcast signal may be disposed on one side of the second rear case 100B-2. The antenna 105 may be installed so as to be able to be pulled out from the second body 100B-2.

A slider module 100C may be disposed on the first rear case 100A-2 of the first body 100A. The slider module 100C may couple the first body 100A and the second body 100B so that the first body 100A and the second body 100B can slide up or down on each other. The slider module 100C may be partially exposed by the second front case 100B-1. A fourth user input module 130e may be disposed on one side of the second rear case 100B-2. The fourth user input module 130e may be used to choose a certain function or may serve as a confirmation key. In addition, the fourth user input module 130e may serve as a hot key for activating a certain function of the mobile terminal 100.

The second camera 121b is illustrated in FIG. 3 as being disposed on the second body 100B, but the present invention is not restricted to this.

For example, at least one of the antenna, the second camera 121b and the camera flash 125 may be mounted on the first body 100A, and particularly, the first rear case 100A-2 of the first body 100A. The first camera 121a may be able to rotate and thus to cover the photographing direction of the second camera 121a. In this case, the second camera 121b may be optional.

The power supply unit 190 may be disposed on the second rear case 100B-2. The power supply unit 190 may be a rechargeable battery and may be coupled to the second body 100B so as to be attachable to or detachable from the second body 100B.

Figure 4:
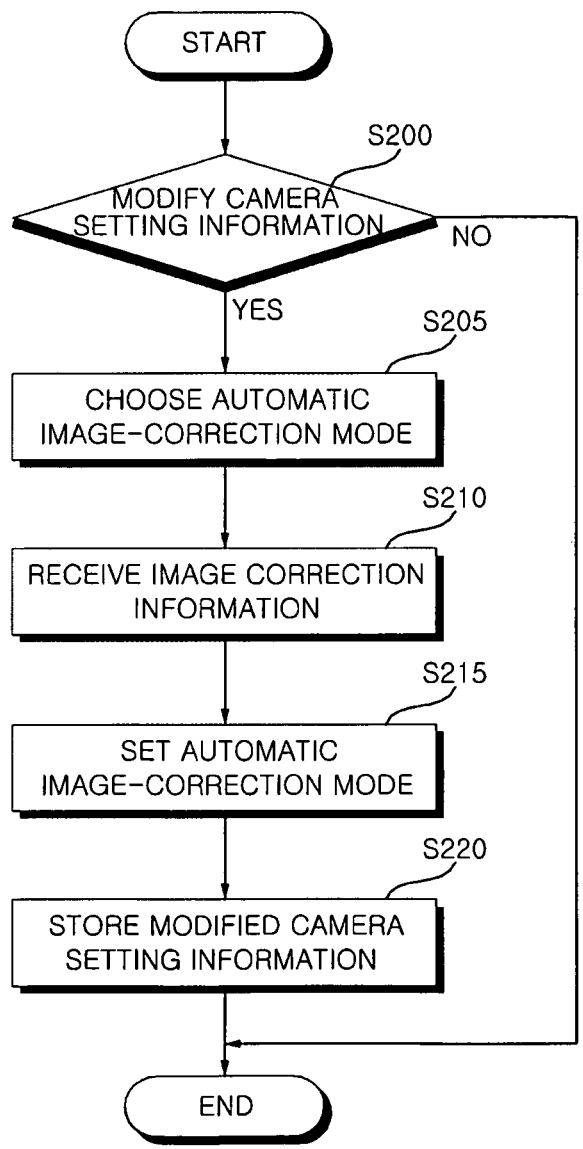
FIGS. 4 through 6 illustrate flowcharts of methods of controlling a mobile terminal according to exemplary embodiments of the present invention.

FIG. 4 illustrates a flowchart of a method of controlling a mobile terminal according to an exemplary embodiment of the present invention. Referring to FIG. 4, if a menu for modifying camera setting information is chosen in response to manipulation of the user input unit 130 (S200), the controller 180 may display a screen image for modifying camera setting information on the display module 151.

If an automatic image-correction mode for automatically correcting an image captured by the camera 121 is chosen with the use of the user input unit 130 (S205), at least one image correction information for correcting an image captured by the camera 121 may be received (S210). The image correction information may include image correction time information and information necessary for correcting an image such as hue information, brightness information, and sharpness information.

The controller 180 may set the automatic image-correction mode based on the received image correction information (S215), and may store modified camera setting information regarding the setting of the automatic image-correction mode in the memory 160 (S220).

Therefore, the controller 180 may allow an image captured by the camera 121 to be automatically corrected according to the received image correction information.

Figure 5:
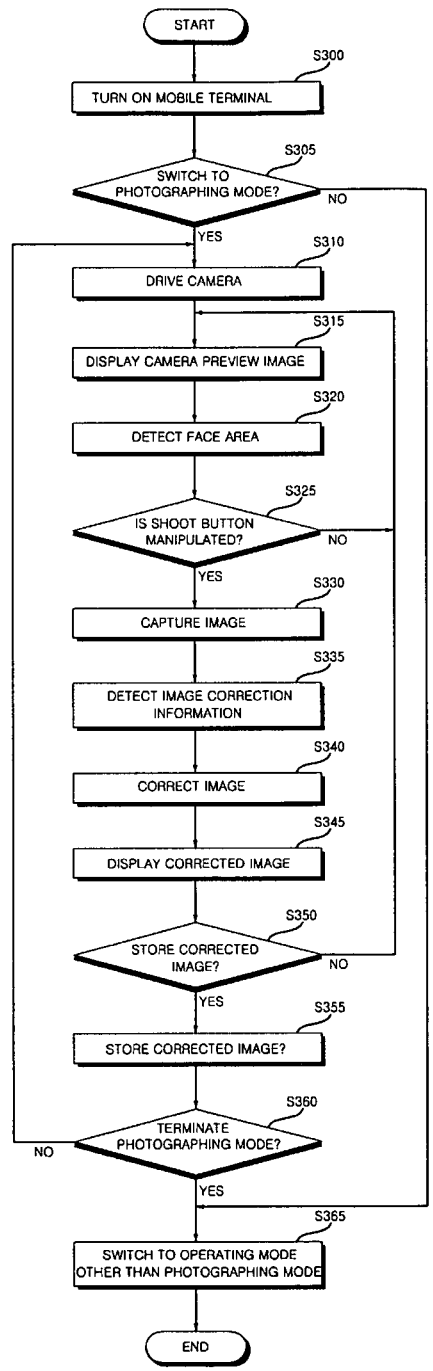

FIG. 5 illustrates a flowchart of an image correction method of the mobile terminal 100 according to an exemplary embodiment of the present invention. Referring to FIG. 5, if the mobile terminal 100 is turned on (S300) and a command to switch to a photographing mode is received from the user input unit 130 (S305), the controller 180 may place the mobile terminal 100 in the photographing mode, and may drive the camera 121 (S310). Thereafter, the controller 180 may allow an image (hereinafter referred to as the current image) currently being received through the camera 121 to be displayed on the display module 151 in real time (S315).

The controller 180 may detect a face area from the current image (S320). More specifically, a number of edges may be detected from the current image based on the relative positions of the eyes and the mouth in the current image, and an area enclosed by the detected edges may be detected as the face area. The detection of the face area may be performed using various face detection methods available for use in devices equipped with cameras.

If a command to capture an image is issued to the camera 121 by manipulating a 'shoot' button (S325), the camera 121 may capture the current image (S330). Thereafter, the controller 180 may detect at least one image correction information (S335), and may correct the image captured by the camera 121 according to the detected image correction information (S340).

Thereafter, the controller 180 may display the corrected image on the display module 151 (S345). If a command to store an image is issued through the user input unit 130 (S350), the controller 180 may store the corrected image in the memory 160 (S355). If a command to store an image is not issued (S350) or if a command to terminate the photographing mode is not issued (S360), the image correction method returns to operation S315.

If a command to terminate the photographing mode is issued through the user input unit 130 (S360), the controller 180 may terminate the photographing mode, and may switch the mobile terminal 100 to an operating mode other than the photographing mode (S365).

Figure 6:
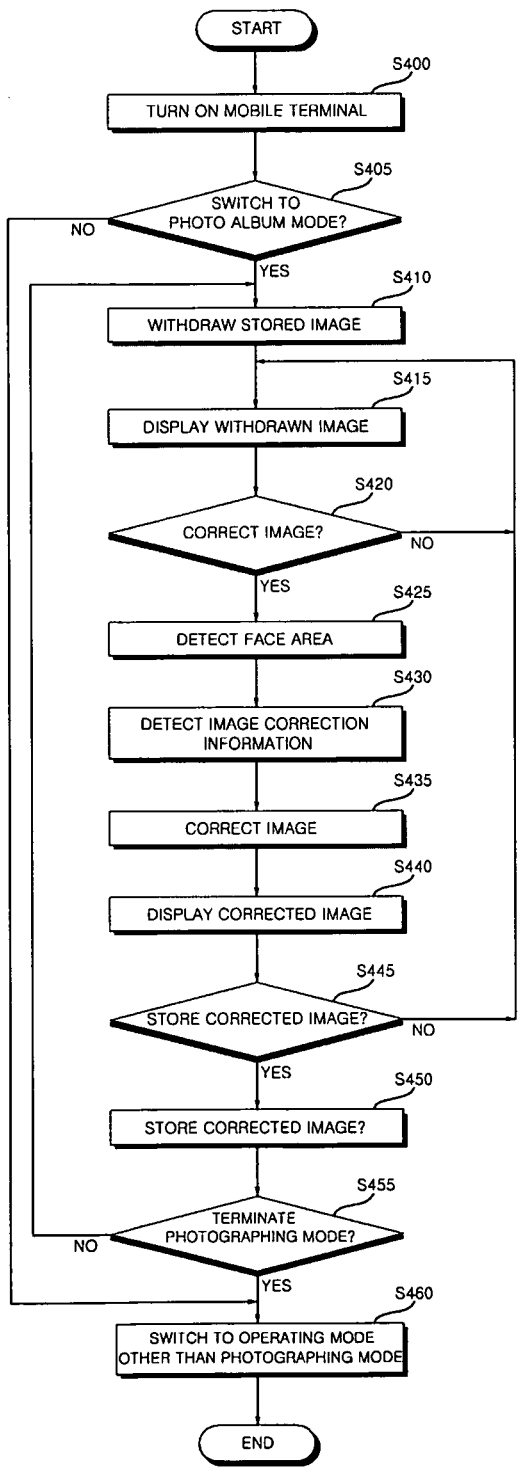

FIG. 6 illustrates a flowchart of an image correction method of the mobile terminal 100 according to another exemplary embodiment of the present invention. More specifically, FIG. 6 illustrates a flowchart showing how to correct an image withdrawn from the memory 160.

Referring to FIG. 6, if the mobile terminal 100 is turned on (S400) and a command to switch to a photo album mode is received through the user input unit 130 (S405), the controller 180 may place the mobile terminal 100 in the photo album mode, may withdraw one or more images from the memory 160, and may display the withdrawn images on the display module 151 (S410).

If one of the displayed images is chosen in response to manipulation of the user input unit 130, the controller 180 may display the chosen image on the display module 151 (S415). The controller 180 may provide an image correction menu for correcting an image.

If the image correction menu is chosen (S420), the controller 180 may detect a face area from the image displayed on the display module 151 (S425). Thereafter, the controller 180 may detect at least one image correction information (S430) and may correct the image displayed on the display module 151, and particularly, the detected face area, based on the detected image correction information (S435).

The controller 180 may display the corrected image on the display module 151 (S440). If a command to store an image is issued through the user input unit 130 (S445), the controller 180 may store the corrected image in the memory 160 (S450). More specifically, the controller 180 may store the corrected image as a separate file from the original image or may overwrite the original image with the corrected image.

If the user wishes not to store the corrected image (S440) or if a command to terminate the photo album mode is issued (S455) after the storing of the corrected image, the image correction method returns to operation S415.

If a command to terminate the photo album mode is issued through the user input unit 130 (S455), the controller 180 may terminate the photo album mode, and may switch the mobile terminal 100 to an operating mode other than the photo album mode (S460).

FIGS. 7 through 14 illustrate diagrams for explaining the methods shown in FIGS. 4 through 6.

Figure 7:
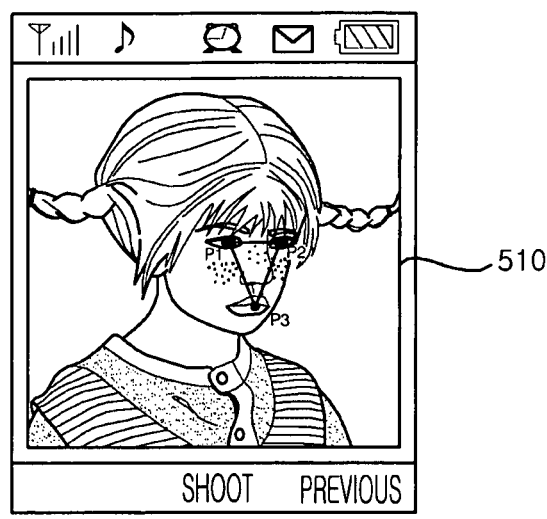
Figure 8:
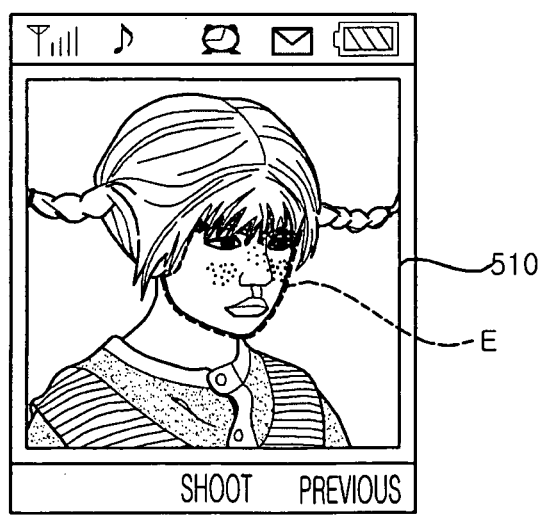

FIGS. 7 and 8 illustrate diagrams for explaining how to detect a face area from an image. Referring to FIG. 7, the controller 180 may display an image currently being received through the camera 121 on the display module 151. Thereafter, the controller 180 may determine the positions of the eyes and the mouth in the image 510, i.e., the positions of points P1 through P3, and may determine a face region in the image 510 based on the relative positions of the points P1 through P3. Thereafter, referring to FIG. 8, the controller 180 may detect an edge area from the face region, and may recognize the detected edge area as a face area E. In this manner, the controller 180 may detect a face area from the image 510.

Figure 9A:
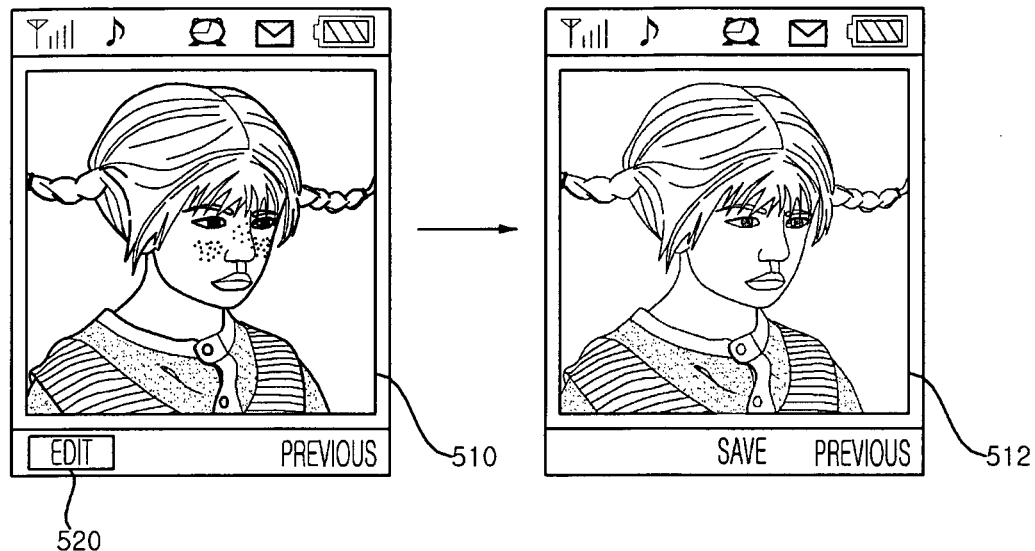
Figure 9B:
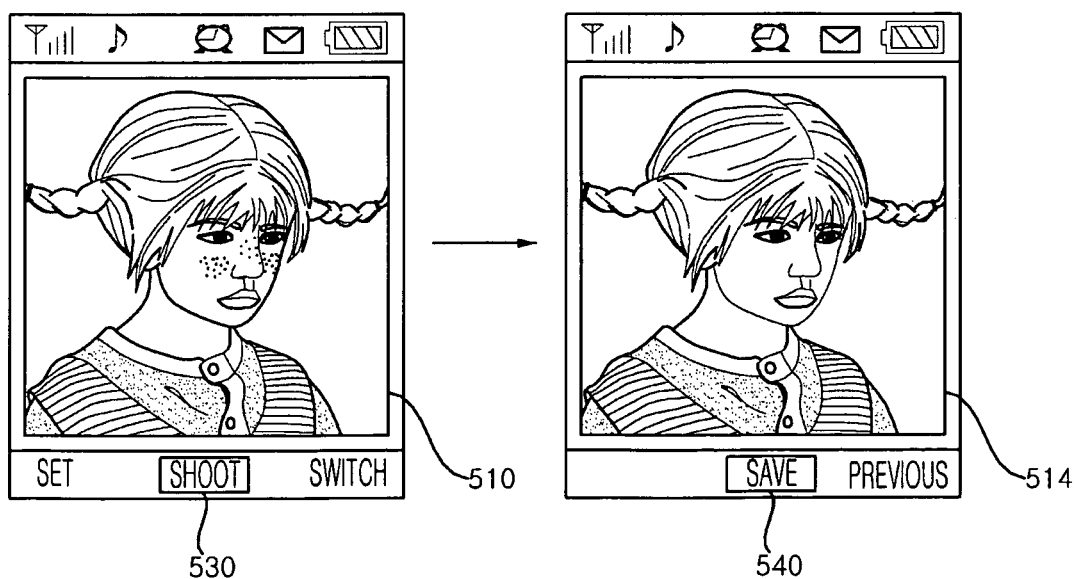

FIG. 9A illustrates a diagram of an image corrected by a conventional mobile terminal, and FIG. 9B illustrates a diagram of an image corrected by the mobile terminal 100.

Referring to FIG. 9A, in the prior art, an image 510 withdrawn from the memory 160 may be displayed on the display module 151. Thereafter, if an 'edit' menu 520 is chosen and a command to correct an image is issued, the whole image 510 may be corrected, thereby obtaining a corrected image 512, which is generally blurrier than the original image 510.

Referring to FIG. 9B, according to an exemplary embodiment of the present invention, an image captured by the camera 121 may be readily corrected, and thus, there is no need to store an image captured by the camera 121, withdraw the stored image and correct the withdrawn image. In addition, if a 'shoot' menu 30 is chosen when an image 10 received through the camera 121 is displayed on the display module 151, the controller 180 may detect a face area from the image 10 using the method described above with reference to FIGS. 7 and 8, and may correct the face area of the image 10, and may display a corrected image 514 obtained by the correction on the display module 151. Thereafter, the controller 180 may display the corrected image 514 on the display module 151.

That is, the corrected image 514 is an image obtained by correcting the face area in the image 510 according to previously-set image correction information, and may thus be the same as the image 510 except for the face area. Therefore, it is possible to effectively correct the image 510 without causing damage to the whole image 10. If a 'save' menu 540 is chosen for the corrected image 514, the controller 180 may store the corrected image 514 in the memory 160.

The correction of an image may be performed based on image correction information received during the setting of an automatic image-correction mode or based on image correction information received through the user input unit 130 when the image is captured by the camera 121.

Figure 10A:
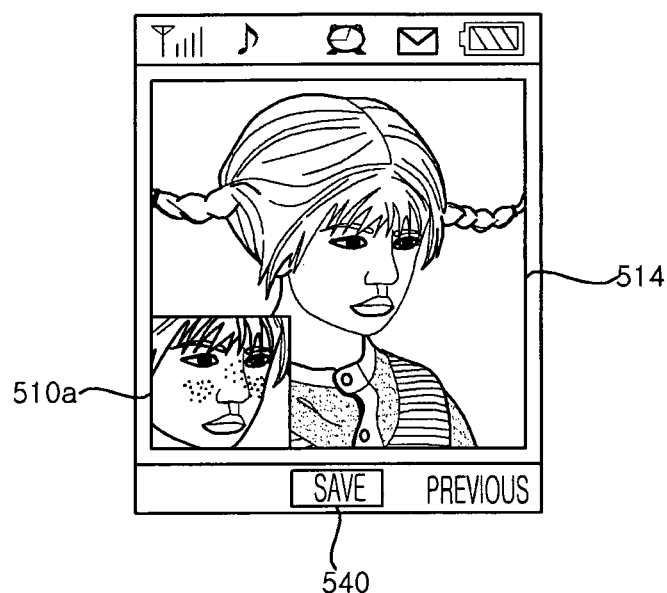
Figure 10B:
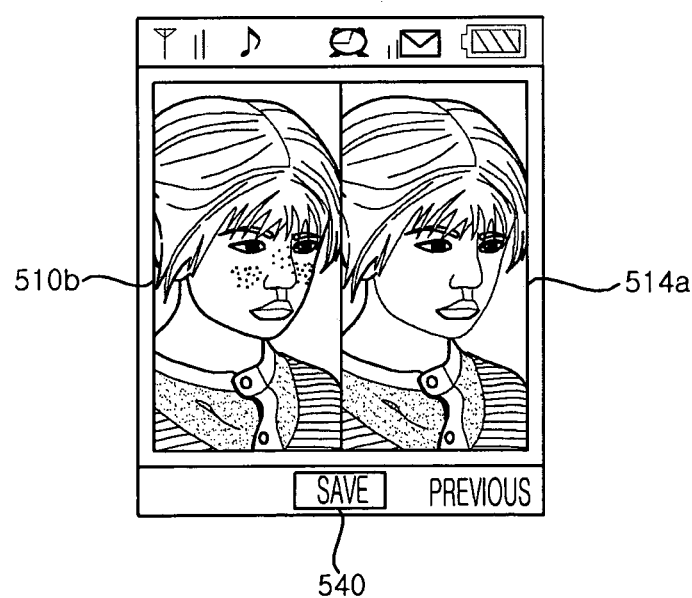

FIGS. 10A and 10B illustrate diagrams showing how to display a corrected image on the display module 151. In the exemplary embodiment of FIG. 9B, only a corrected image obtained by correcting an image captured by the camera 121 may be displayed on the display module 151. On the other hand, referring to FIG. 10A, a corrected image 514 obtained by correcting an original image may be displayed on the display module 151, and a partial image 510a, which corresponds to a face area detected from the original image, may be displayed over a certain part of the corrected image 514.

Alternatively, referring to FIG. 10B, the controller 180 may divide the screen of the display module 151 into at least two screens, and may display a first partial image 510b, which accounts for part of the original image, and a second partial image 514a, which accounts for part of the corrected image 514, on the two screens, respectively. Alternatively, the controller 180 may display both the original image and the corrected image 514 as a whole on the display module 151.

If a 'save' menu 540 is chosen when the first and second partial images 510b and 514a are displayed on the display module 151, the controller 180 may store the corrected image 514 in the memory 160. The controller 180 may also store the original image in the memory 160 together with the corrected image 514. Alternatively, the controller 180 may store a combined image of the corrected image 514 and the original image as it is displayed on the display module 151, as shown in FIG. 10A or 10B.

The correction of an image except for a face area detected from the image will hereinafter be described in detail with reference to FIG. 11.

Figure 11:
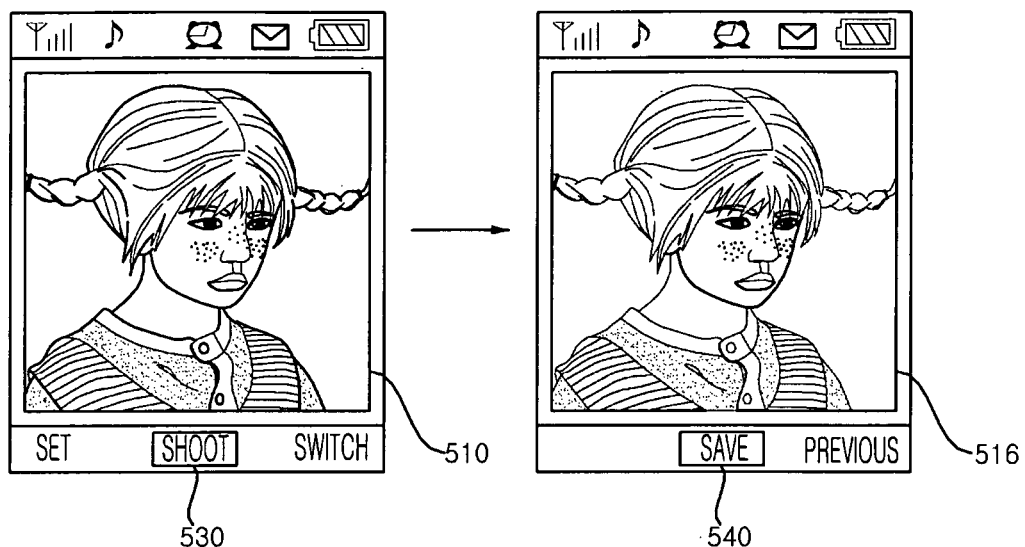

Referring to FIG. 11, if a 'shoot' menu 530 is chosen when a camera preview image received through the camera 121 is displayed on the display module 151, the controller 180 may detect a face area from an image 510 captured by the camera 121, and may correct the image 510 except for the face area, and may display a corrected image 516 obtained by the correction on the display module 151. Therefore, it is possible to emphasize the face area in the image 510 by blurring the whole image 510 except for the face area. The correction of an image except for a face area detected from the image may be performed based on image correction information received during the setting of an automatic image-correction mode or based on image correction information received through the user input unit 130 when the image is captured by the camera 121.

If a 'save' menu 540 is chosen when the corrected image 516 is displayed on the display module 151, the controller 180 may store the corrected image 516 in the memory 160. The controller 180 may also store the image 510 in the memory 160 together with the corrected image 516.

Figure 12:
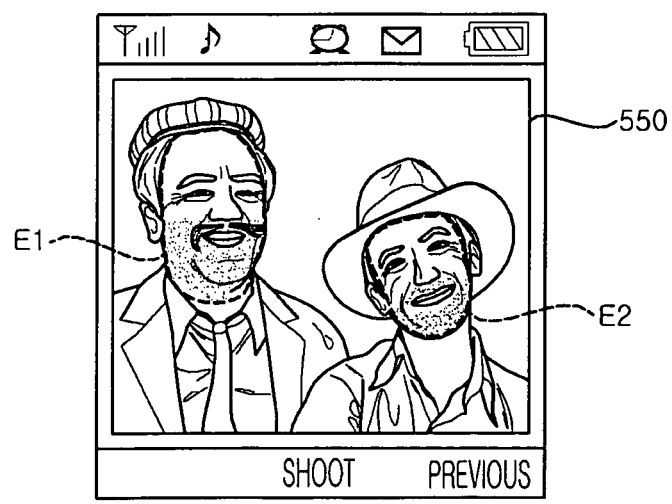
Figure 13A:
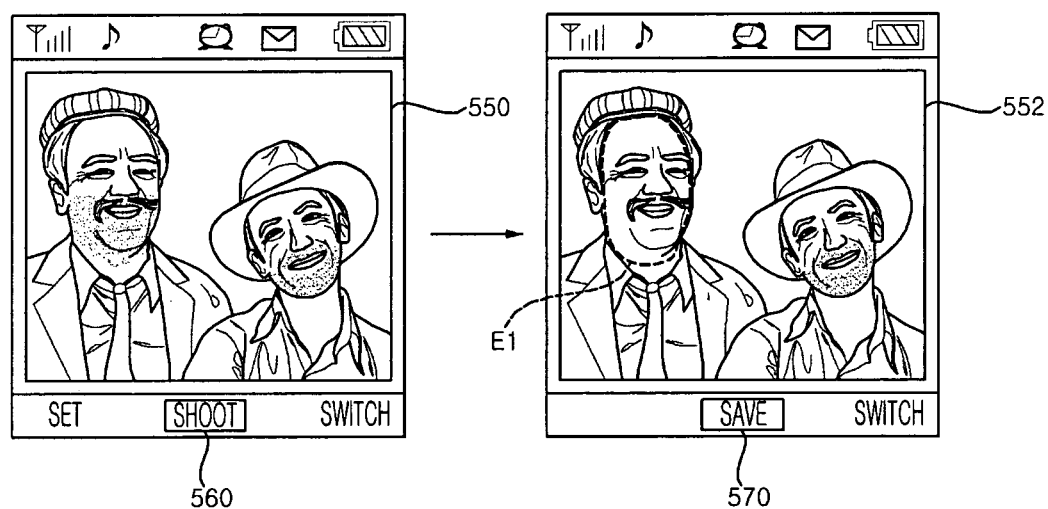
Figure 13B:
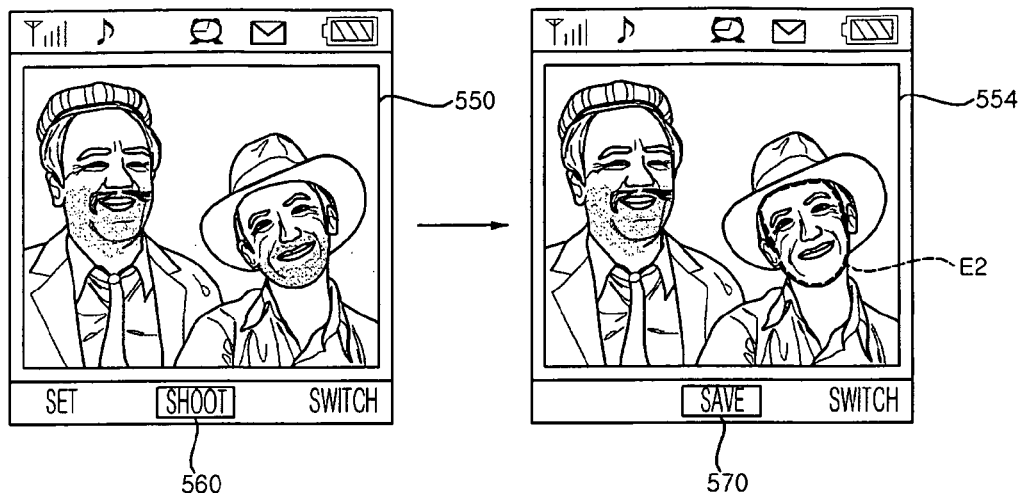
Figure 13C:
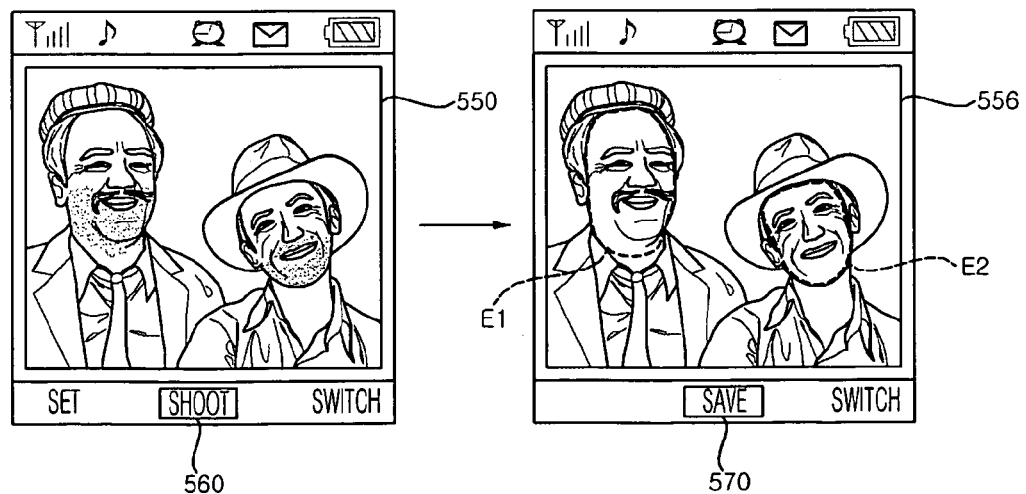

FIGS. 12 through 13C illustrate diagrams showing how to correct an image captured by the camera 121 when the image has two or more face areas.

Referring to FIGS. 12 and 13A, if a 'shoot' menu 560 is chosen when an image 550 received through the camera 121 and including face areas E1 and E2 is displayed on the display module 151, the controller 180 may detect the face areas E1 and E2 from the image 550, may correct one of the face areas E1 and E2, e.g., the face area E1, and may display a corrected image 552 obtained by the correction on the display module 151. Thereafter, if a 'save' menu 570 is chosen, the controller 180 may store the corrected image 552 in the memory 160. The controller 180 may also store the original image 550 in the memory 160 together with the corrected image 552.

Alternatively, referring to FIG. 13B, the controller 180 may correct the face area E2 and may display a corrected image 554 obtained by the correction on the display module 151. Thereafter, if the 'save' menu 570 is chosen, the controller 180 may store the corrected image 554 in the memory 160. The controller 180 may also store the original image 550 in the memory 160 together with the corrected image 554.

Still alternatively, referring to FIG. 13C, the controller 180 may correct both the face areas E1 and E2. More specifically, if the 'shoot' menu 560 is chosen when the image 550 is displayed on the display module 151, the controller 180 may detect the face areas E1 and E2 from the image 550, may correct both the face areas E1 and E2, and may display a corrected image 556 obtained by the correction on the display module 151. Thereafter, if the 'save' menu 570 is chosen, the controller 180 may store the corrected image 556 in the memory 160. The controller 180 may also store the original image 550 in the memory 160 together with the corrected image 556.

FIG. 14 illustrates a diagram showing how to correct an image withdrawn from the memory 160, and particularly, a face area in the image. Referring to FIG. 14, if a command to call a photo album is applied in response to manipulation of the user input unit 130, the controller 180 may withdraw one or more images from the memory 160, and may display an image 580 chosen from the withdrawn images on the display module 151. The controller 180 may provide a menu for correcting an image displayed on the display module 151. If a 'menu' item 90 is chosen, a number of menu items may be displayed on the display module 151. Thereafter, if one of the menu items, e.g., a '2: Correct Image' item 592 is chosen, the controller 180 may detect a face area from the image 580, may correct the face area, and may display a corrected image 585 obtained by the correction on the display module 151. Thereafter, if a 'save' menu 596 is chosen, the controller 180 may store the corrected image 585 in the memory 160.

The mobile terminal according to the present invention and the method of controlling a mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to automatically correct an image according to image correction information set in advance during the capture of the image by a camera. Therefore, it is possible to readily view a corrected image whenever an image is captured by a camera. In addition, it is possible to selectively correct parts of an image captured by a camera and thus to improve the efficiency of correction of an image without deteriorating the quality of an original image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    selecting a menu for modifying camera setting information in response to a first user input;
    displaying a first screen image corresponding to the selected menu on a display of the mobile terminal;
    selecting an automatic image-correction mode from the first screen image in response to a second user input;
    displaying a second screen image for receiving at least one image correction information for correcting a captured image;
    setting the automatic image-correction mode based on the received image correction information;
    storing modified camera setting information including the automatic image-correction mode set based on the received image correction information in a memory of the mobile terminal;
    displaying a preview image received in real time via a camera of the mobile terminal, the preview image viewable in real time via the display;

detecting a face area in the preview image;
detecting the image correction information stored in the memory when the camera is used to capture the preview image, the image correction information being set by a user in advance of the displaying of the preview image;
detecting manipulation of a shutter button of the camera by the user when the camera is used to capture the preview image as a captured image;
automatically correcting the captured image according to the detected image correction information without additional user input in response to the detection of the manipulation of the shutter button;
if the automatic image-correction mode is not set in advance by the user prior to the capturing of the preview image, correcting the captured image based on image correction information set in response to a third user input, the third user input comprising manually setting the image correction information when the shutter button is manipulated;
displaying the corrected captured image on the display; and
storing the corrected captured image in the memory,
wherein correcting the captured image includes either correcting the detected face area or correcting the captured image except for the detected face area.

2. The method of claim 1, further comprising storing the captured image along with the corrected captured image.

3. The method of claim 1, wherein the image correction information includes information indicating at least whether to automatically correct hue information, brightness information, chroma information, or sharpness information of the captured image.

4. The method of claim 1, wherein detecting the face area comprises:
detecting an edge area based on relative positions of eyes and mouth of the face area of the preview image; and
detecting the face area using the edge area.

5. The method of claim 1, wherein displaying the corrected captured image comprises overlaying an image of the detected face area with a portion of the corrected captured image.

6. The method of claim 1, wherein displaying the corrected captured image comprises:
dividing a screen of the display into at least two portions;
displaying the captured image on one of the two divided portions; and
displaying the corrected captured image on the other of the two divided portions of the screen.

7. The method of claim 1, further comprising:
reading the stored corrected captured image; and
displaying an image correction menu for correcting the read image.

8. The method of claim 7, further comprising:
detecting a face area of the read image using the image correction menu;
correcting the read image using the detected face area of the read image;
displaying the corrected read image; and
storing the corrected read image.

9. A mobile terminal comprising:
a camera configured to capture an image;
a display configured to display information;
a memory to store information; and
a controller configured to:
select a menu for modifying camera setting information in response to a first user input;
cause the display to display a first screen image corresponding to the selected menu;
select an automatic image-correction mode from the first screen image in response to a second user input;
cause the display to display a second screen image for receiving at least one image correction information for correcting a captured image;
set the automatic image-correction mode based on the received image correction information;
cause the memory to store the modified camera setting information including the automatic image-correction mode set based on the received image correction information;
cause the display to display a preview image received in real time via the camera, the preview image viewable in real time on the display;
detect a face area in the preview image;
detect the image correction information stored in the memory when the camera is used to capture the preview image, the image correction information being set by a user in advance of the displaying of the preview image;
detect manipulation of a shutter button of the camera by the user when the camera is used to capture the preview image as a captured image; and
automatically correct the captured image according to the image correction information without additional user input in response to the detection of the manipulation of the shutter button,
if the automatic image-correction mode is not set in advance by the user prior to the capturing of the preview image, correct the captured image based on image correction information set in response a third user input, the third user input comprising manually setting the image correction information when the shutter button is manipulated; and
cause the display to display the corrected captured image,
wherein correcting the captured image includes either correcting the detected face area or correcting the captured image except for the detected face area.

10. The mobile terminal of claim 9, wherein the memory is further configured to store the corrected captured image, wherein the controller is further configured to control the memory to store the corrected captured image.

11. The mobile terminal of claim 10, wherein the controller is further configured to control the memory to store the image correction information used for the corrected captured image.

12. The mobile terminal of claim 10, wherein the controller is further configured to read the stored corrected captured image from the memory and control the display to display an image correction menu for correcting the read image.

13. The mobile terminal of claim 9, further comprising a user input unit configured to receive an input to capture the preview image via the camera.

* * * * *